United States Patent
Komeno et al.

(10) Patent No.: US 8,156,615 B2
(45) Date of Patent: Apr. 17, 2012

(54) CONNECTING STRUCTURES

(75) Inventors: Jyun Komeno, Okazaki (JP); Toshio Iwahara, Okazaki (JP)

(73) Assignee: Daiwa Kasei Kogyo Kabushiki Kaisha, Aichi (JP)

( * ) Notice: Subject to any disclaimer, the term of this patent is extended or adjusted under 35 U.S.C. 154(b) by 329 days.

(21) Appl. No.: 12/583,516

(22) Filed: Aug. 21, 2009

(65) Prior Publication Data
US 2010/0050401 A1 Mar. 4, 2010

(30) Foreign Application Priority Data
Aug. 29, 2008 (JP) ................................ 2008-221065

(51) Int. Cl.
*F16B 2/02* (2006.01)

(52) U.S. Cl. .............................. 24/297; 24/458; 411/511
(58) Field of Classification Search .................... 24/297, 24/453, 458; 403/408.1; 411/508–510, 433, 411/437, 511, 512
See application file for complete search history.

(56) References Cited

U.S. PATENT DOCUMENTS
7,257,867 B2 * 8/2007 Mizukoshi et al. ............. 24/297

FOREIGN PATENT DOCUMENTS
JP 2008116035 A 5/2008

* cited by examiner

*Primary Examiner* — James Brittain
(74) *Attorney, Agent, or Firm* — Lawrence G. Fridman

(57) ABSTRACT

A connecting structure for connecting a first component to a second component may include a clip and a hollow seat portion. The clip is capable of engaging the second component and has a hollow main body. The main body has a support shaft and at least one engagement blade formed therein. The hollow seat portion is integrally formed in the first component and has at least one engagement wall portion. The clip main body is constructed to be placed on the seat portion while the seat portion is introduced thereinto. The support shaft is constructed to be introduced into the seat portion when the clip main body is placed on the seat portion. The at least one engagement wall portion has at least one rib portion that is capable of contacting the support shaft introduced into the seat portion. The at least one engagement blade is arranged and constructed to engage the at least one engagement wall portion when the clip is rotated about an axis thereof, so that the clip can be secured to the seat portion.

6 Claims, 6 Drawing Sheets

CONNECTING STRUCTURES

This application claims priority to Japanese Patent Application Serial Number 2008-221065, the contents of which are incorporated herein by reference.

FIELD OF THE INVENTION

The present invention relates to connecting structures for connecting two components. More particularly, the present invention relates to connecting structures for connecting a first component to a second component using plastic clips.

BACKGROUND OF THE INVENTION

Description of Related Art

A connecting structure for connecting two components is already known. Such a connecting structure is taught, for example, by Japanese Laid-Open Patent Publication No. 2008-116035. In the connecting structure, a plate-shaped component or first component (e.g., a door trim) has a plurality of cylindrical seat portions each of which is integrally attached to an inner surface of the main portion. Conversely, a clip has a base portion (a main body) and an anchor portion. The base portion has engagement blades that are formed therein.

The clip thus constructed is placed on the seat portion of the first component while the seat portion is introduced into the clip base portion. Thereafter, the clip is rotated about an axis of the seat portion of the first component through an angle of 90 degrees such that the engagement blades formed in the base portion can engage or bite into a circumferential surface of the seat portion. As a result, the clip can be connected or secured to the seat portion of the first component, so as to be attached to the first component. Thereafter, the anchor portion of the clip attached to the first component is inserted into an attachment hole formed in a second component (e.g., a door panel), so that the clip can be coupled to the second component. Thus, the first component can be connected to the second component via the clip.

The first component may preferably be integrally formed by plastic molding. Generally, in order to avoid post-molding shrinkage from being generated in an outer (ornamental) surface of the first component, a wall thickness of the seat portion must be uniformed and thinned to a maximum extent. The seat portion having the uniformed and thinned wall thickness may inherently have a reduced rigidity. Therefore, when the clip is rotated, the seat portion can be easily flexed or deformed inwardly. As a result, the engagement blades of the clip base portion cannot sufficiently engage the seat portion. This means that the clip cannot be reliably secured to the seat portion of the first component. As a result, the first component cannot be reliably connected to the second component via the clip.

BRIEF SUMMARY OF THE INVENTION

For example, in one aspect of the present invention, a connecting structure for connecting a first component to a second component may include a clip and a hollow seat portion. The clip is capable of engaging the second component and has a hollow main body. The main body has a support shaft and at least one engagement blade formed therein. The hollow seat portion is integrally formed in the first component and has at least one engagement wall portion. The clip main body is constructed to be placed on the seat portion while the seat portion is introduced thereinto. The support shaft is constructed to be introduced into the seat portion when the clip main body is placed on the seat portion. The at least one engagement wall portion has at least one rib portion that is capable of contacting the support shaft introduced into the seat portion. The at least one engagement blade is arranged and constructed to engage the at least one engagement wall portion when the clip is rotated about an axis thereof, so that the clip can be secured to the seat portion.

According to the connecting structure thus constructed, when the clip is rotated (i.e., when the at least one engagement blade engages the at least one engagement wall portion), the at least one engagement wall portion can be effectively prevented from being flexed or deformed inwardly because the at least one engagement wall portion can substantially be supported by the support shaft via the at least one rib portion. Therefore, the at least one engagement blade can sufficiently engages the at least one engagement wall portion, so that the clip can be reliably secured to the seat portion of the first component. This means that even if the seat portion is entirely uniformed and thinned in wall thickness, the at least one engagement blade can sufficiently engage the at least one engagement wall portion, so that the clip can be reliably secured to the seat portion of the first component.

The at least one engagement blade may preferably include at least two engagement blades that are positioned diametrically opposite to each other. The at least one engagement wall portion may preferably include a pair of diametrically opposite engagement wall portions. Further, the at least one rib portion may preferably include a pair of rib portions that are respectively formed in the engagement wall portions.

Other objects, features and advantages of the present invention will be readily understood after reading the following detailed description together with the accompanying drawings and the claims.

DETAILED DESCRIPTION OF THE INVENTION

Representative examples of the present invention have been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

Detailed representative embodiments of the present invention are shown in FIGS. 1 to 10.

A first detailed representative embodiment of the present invention will be described with reference to FIGS. 1 to 9.

Figure 8:
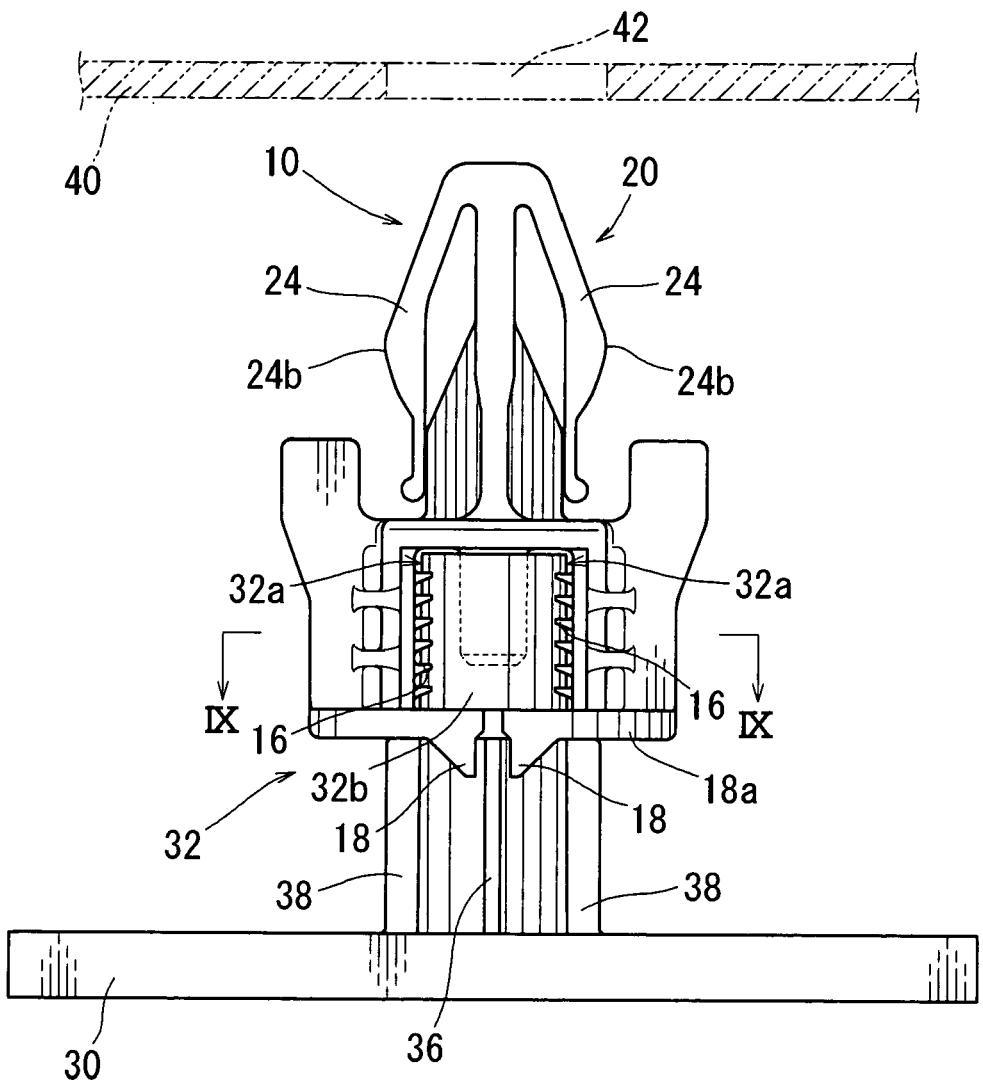
FIG. 8 is an elevational view of the clip and the plate-shaped component, which illustrates a condition in which the clip is rotated and secured to the seat portion of the plate-shaped component and in which the clip is not inserted into an attachment hole of a support member.

As shown in FIG. 8, the present embodiment exemplifies a connecting structure for connecting a plastic plate-shaped component 30 (e.g., a center cluster) to a support member 40 (e.g., a vehicle body panel) via a plurality of clips 10 (one of which is shown). Further, the clips 10 respectively have the same construction as each other. Therefore, the clip 10 shown therein will be described hereinafter. Also, the plate-shaped component 30 may be referred to as a first component or an attaching object. Conversely, the support member 40 may be referred to as a second component or a support body.

Figure 1:
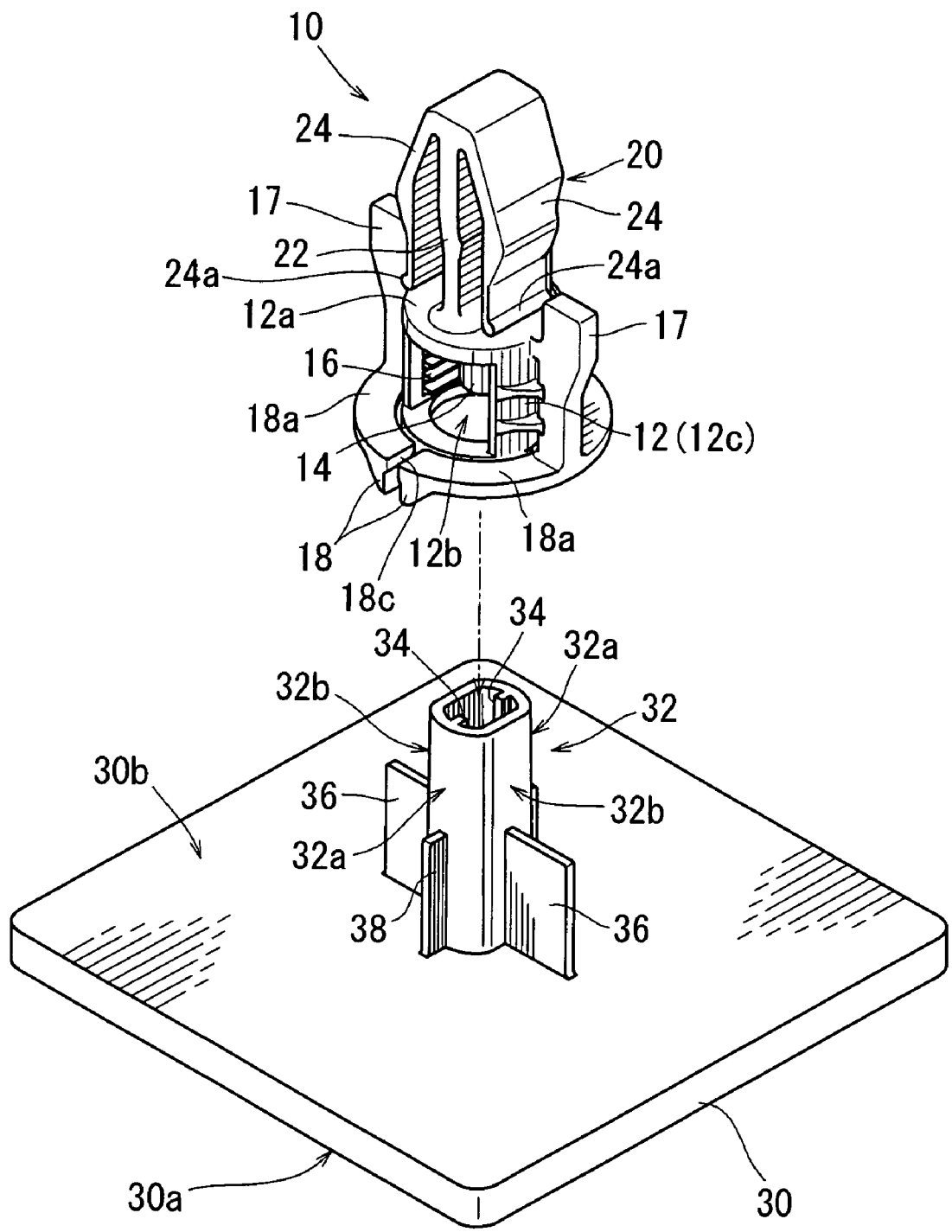
FIG. 1 is a perspective view of a clip and a plate-shaped component according to a first embodiment of the present invention, which illustrates a condition in which the clip is not attached to the plate-shaped component.

The clip 10 may preferably be integrally formed by plastic molding. Similarly, the plate-shaped component 30 may preferably be integrally formed by plastic molding. As best shown in FIG. 1, the clip 10 has a base portion (a main body) 12 and an anchor portion 20. Conversely, the plate-shaped component 30 has an inner surface 30*b* and an outer (ornamental) surface 30*a* opposite to each other. Also, the plate-shaped component 30 has a plurality of (boss-shaped) hollow seat portions 32 (one of which is shown) that are integrally formed in the inner surface 30*b* of the plate-shaped component 30. Further, the hollow seat portions 32 respectively have the same construction as each other. Therefore, one of the hollow seat portions 32 will be described hereinafter. Further, the plate-shaped component 30 is partially shown in the drawings for simplification.

As described in detail hereinbelow, the base portion 12 of the clip 10 is secured to the seat portion 32 of the plate-shaped component 30, so that the clip 10 is attached to the plate-shaped component 30. Thereafter, the anchor portion 20 of the clip 10 is inserted into one of a plurality of attachment holes 42 (one of which is shown) formed in the support member 40 (FIG. 8), so that the clip 10 is coupled to the support member 40. Thus, the plate-shaped component 30 can be connected to the support member 40 via the clip 10.

Figure 2:
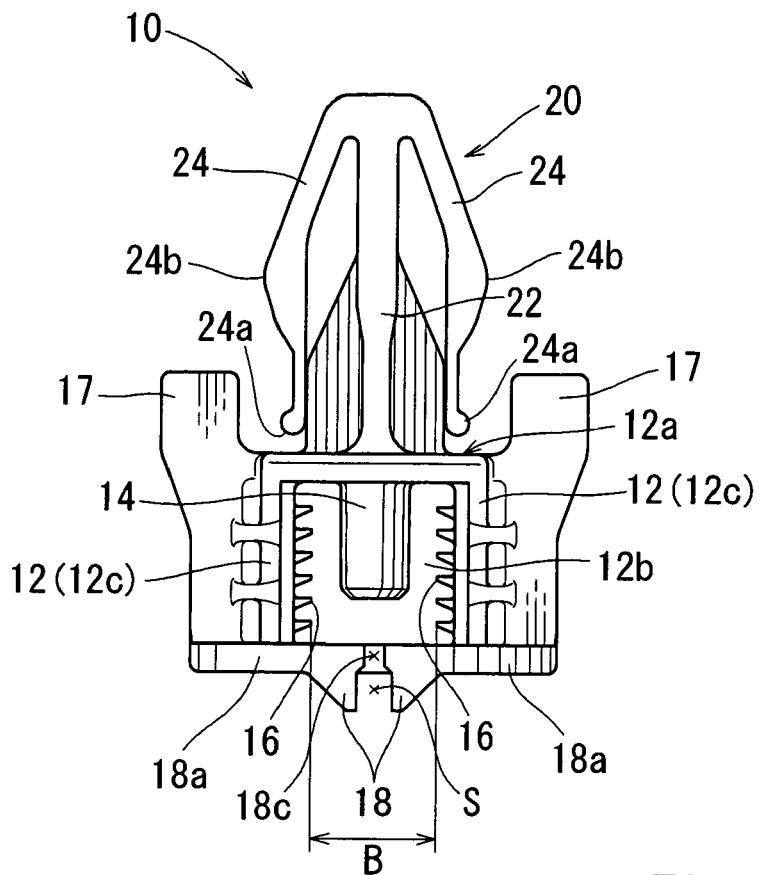
FIG. 2 is an elevational view of the clip.

The base portion 12 of the clip 10 is formed as a topped cylindrical hollow member. That is, the base portion 12 is formed as a cylindrical hollow member having a (flat) top wall portion 12*a*. As best shown in FIG. 2, a pair of removed portions (openings) 12*b*, are formed in the base portion 12. The removed portions 12*b* are formed to be diametrically aligned with each other. Preferably, the removed portions 12*b* are formed in front and rear portions of the base portion 12. As a result, a pair of vertical wall portions (unremoved portions) 12*c* are formed in the base portion 12. The vertical wall portions 12*c* are formed in right and left portions of the base portion 12, so as to be positioned diametrically opposite to each other. Further, the removed portions 12*b* are formed to simplify molding of the clip 10 (i.e., to simplify the design of a die for molding the clip 10).

Further, as best shown in FIG. 2, the base portion 12 of the clip 10 further includes a cylindrical support shaft 14 formed therein. In particular, the support shaft 14 is downwardly projected from an inner surface of the top wall portion 12*a*. The support shaft 14 may preferably be positioned so as to be vertically aligned with an axis of the clip 10 (an axis of the base portion 12 and the anchor portion 20). In addition, as shown in FIGS. 1 and 2, the base portion 12 of the clip 10 has a plurality of securing blades (engagement blades) 16 that are formed in the vertical wall portions 12*c* of the clip base portion 12. The securing blades 16 may preferably be formed so as to laterally extend between the removed portions 12*b* of the clip base portion 12. As best shown in FIG. 2, the securing blades 16 are vertically arranged in two rows so as to be diametrically inwardly opposite to each other. In particular, the securing blades 16 are formed in and inwardly extended from inner surfaces of the vertical wall portions 12*c* of the base portion 12. Therefore, as shown in FIG. 3, a distance B between the rows of securing blades 16 (i.e., a minimum distance between the rows of securing blades 16) is smaller than an inner diameter D of the base portion 12 (the vertical wall portions 12*c*).

As shown in FIGS. 1 and 2, the base portion 12 of the clip 10 has a pair of wing-shaped manipulator strips 17. The manipulator strips 17 are formed in the base portion 12 so as to be vertically extended therealong. That is, the manipulator strips 17 are integrally formed in the vertical wall portions 12*c* of the base portion 12. In particular, the manipulator strips 17 are formed in an outer surface of the base portion 12 (the vertical wall portions 12*c*) so as to be outwardly oppositely projected therefrom. As will be recognized, the manipulator strips 17 can be used to rotate the clip 10 about the axis thereof after the base portion 12 of the clip 10 is placed on the seat portion 32 of the plate-shaped component 30, which will be described hereinafter.

Figure 3:
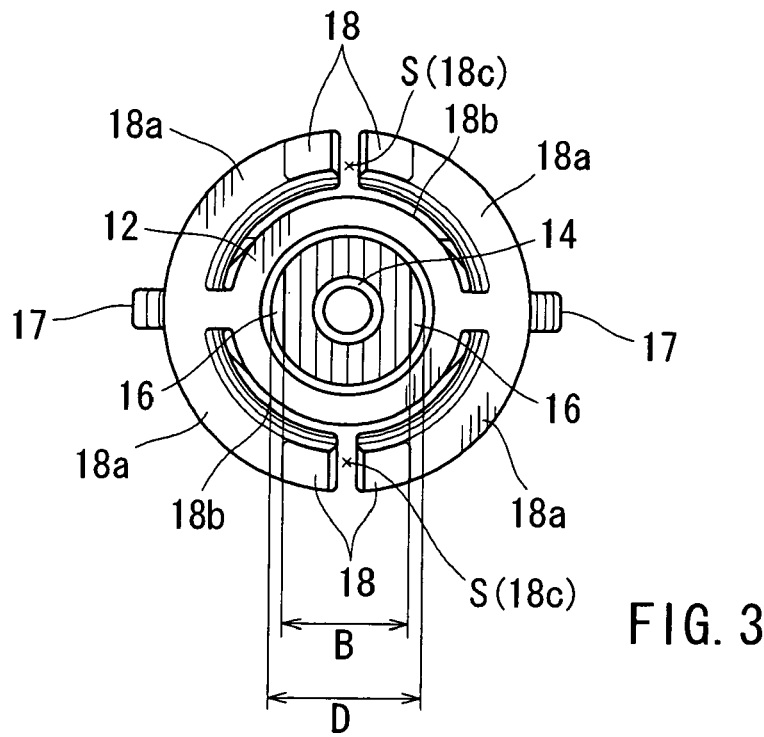
FIG. 3 is a bottom plan view of the clip.

As shown in FIGS. 1 to 3, the base portion 12 of the clip 10 further includes two pairs of arcuate arm portions 18*a*. One or first pair of arm portions 18*a* are respectively integrally formed in lower ends of the manipulator strips 17. That is, proximal ends of the arm portions 18*a* are integrally connected to the lower ends of the manipulator strips 17. The arm portions 18*a* circumferentially oppositely extend along a lower end periphery of the base portion 12, so that distal ends thereof can be circumferentially opposite to each other while leaving a space 18*c* therebetween. Further, the arm portions 18*a* respectively extend through an angle of approximately 90 degrees such that the space 18*c* formed between the distal ends thereof can be radially aligned with the removed portions 12*b* formed in the base portion 12. In addition, as best shown in FIG. 3, the arm portions 18*a* are respectively spaced from the lower end periphery of the base portion 12 such that arcuate slots 18*b* are formed therebetween. Therefore, the arm portions 18*a* can be easily flexed vertically with respect to the lower end of the manipulator strip 17. Conversely, the other or second pair of arm portions 18*a* are respectively formed in the lower ends of the manipulator strips 17 in the substantially same manner as the first pair of arm portions 18*a*. However, the second pair of arm portions 18*a* are formed so as to extend in the directions opposite to the first pair of arm portions 18*a*. In other words, as shown in FIG. 3, the second pair of arm portions 18*a* are formed so as to be symmetrical to the first pair of arm portions 18*a*.

As shown in FIGS. 1 to 3, the base portion 12 of the clip 10 further include two pairs of lock pawls 18. The respective pairs of lock pawls 18 may preferably be positioned so as to substantially correspond to the removed portions 12*b* formed in the base portion 12. One or first pair of lock pawls 18 are respectively integrally formed in the distal ends of the first pair of arm portions 18*a*. The lock pawls 18 are downwardly projected from the distal ends of the arm portions 18a, so as to be circumferentially adjacent to each other. In particular, as best shown in FIG. 2, the lock pawls 18 respectively have vertical inner surfaces and inclined outer surfaces and are positioned such that the vertical inner surfaces thereof are circumferentially opposite to each other while leaving a lock space S therebetween that is vertically aligned with the space 18c. Conversely, the other or second pair of lock pawls 18 are respectively integrally formed in the distal ends of the second pair of arm portions 18a in the same manner as the first pair of lock pawls 18.

As shown in FIGS. 1 and 2, the anchor portion 20 of the clip 10 is constructed of a support column 22 and a pair of (right and left) elastic anchor strips 24. The support column 22, is vertically projected upwardly from the top wall portion 12a of the clip base portion 12. The anchor strips 24 are integrated with an upper end of the support column 22. Further, the anchor strips 24 are extended downwardly along both sides of the support column 22, so as to be flexed relative to the upper end of the support column 22. In addition, the anchor portion 20 (the support column 22 and the anchor strips 24) may preferably be positioned such that free ends 24a of the anchor strips 24 can be flexed or moved rightward and leftward, i.e., toward and away from the manipulator strips 17. The anchor strips 24 respectively have outwardly projected or bulged portions 24b that are formed in vertically intermediate portions. Therefore, when the anchor portion 20 is pushed into the attachment hole 42 of the support member 40 (FIG. 8), the anchor portion 20 can be inserted thereinto while the anchor strips 24 are respectively flexed inwardly. When the anchor portion 20 is completely inserted into the attachment hole 42 of the support member 40 (i.e., when the anchor portion 20 is pushed into the attachment hole 42 until the bulged portions 24b of the anchor portion 20 are positioned inside the support member 40), the bulged portions 24b can elastically engage an inner surface of the support member 40. As a result, the anchor portion 20 (the clip 10) can be securely coupled to the support member 40.

Figure 4:
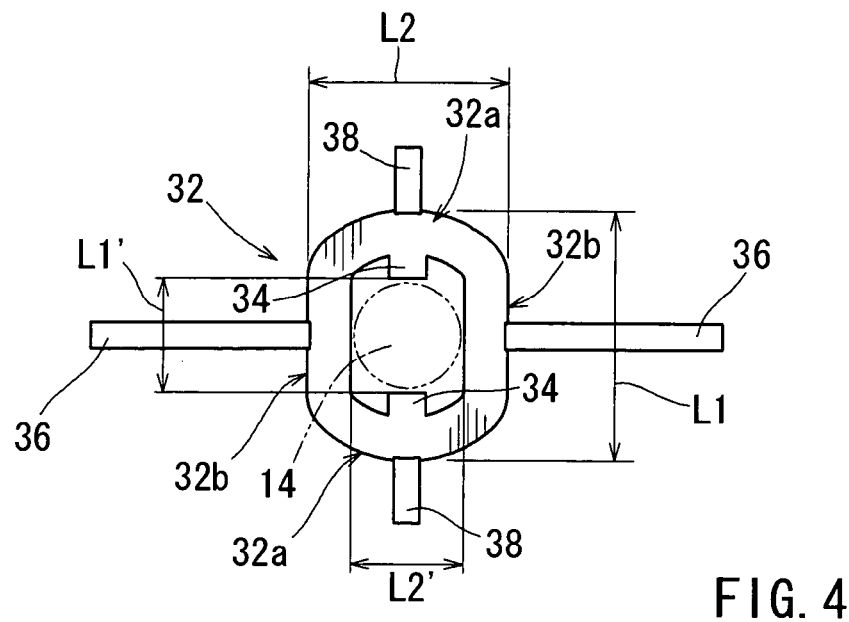
FIG. 4 is an elevational view of a seat portion of the plate-shaped component.

As shown in FIGS. 1 and 4, the seat portion 32 of the plate-shaped component 30 is formed as an open topped hollow member. As best shown in FIG. 4, the seat portion 32 is composed of diametrically opposite (convex) arc-shaped wall portions 32a (functional or engagement wall portions) and diametrically opposite flat wall portions 32b (non-functional or non-engagement wall portions). Further, the arc-shaped wall portions 32a and the flat wall portions 32b are respectively alternately positioned at 90 degrees intervals.

Further, the seat portion 32 may preferably have a uniform wall thickness as a whole. In other words, the arc-shaped wall portions 32a may preferably have the same wall thickness as the flat wall portions 32b. Generally, in plastic molding, when an article to be molded includes extremely thickened portions, such thickened portions can cause post-molding shrinkage that is produced in the molded article due to difference (delay) of a cooling speed in the thickened portions. Therefore, in this embodiment, in order to prevent the post-molding shrinkage from being generated in the outer surface 30a of the plate-shaped component 30, the seat portion 32 is uniformed and thinned in wall thickness.

Figure 5:
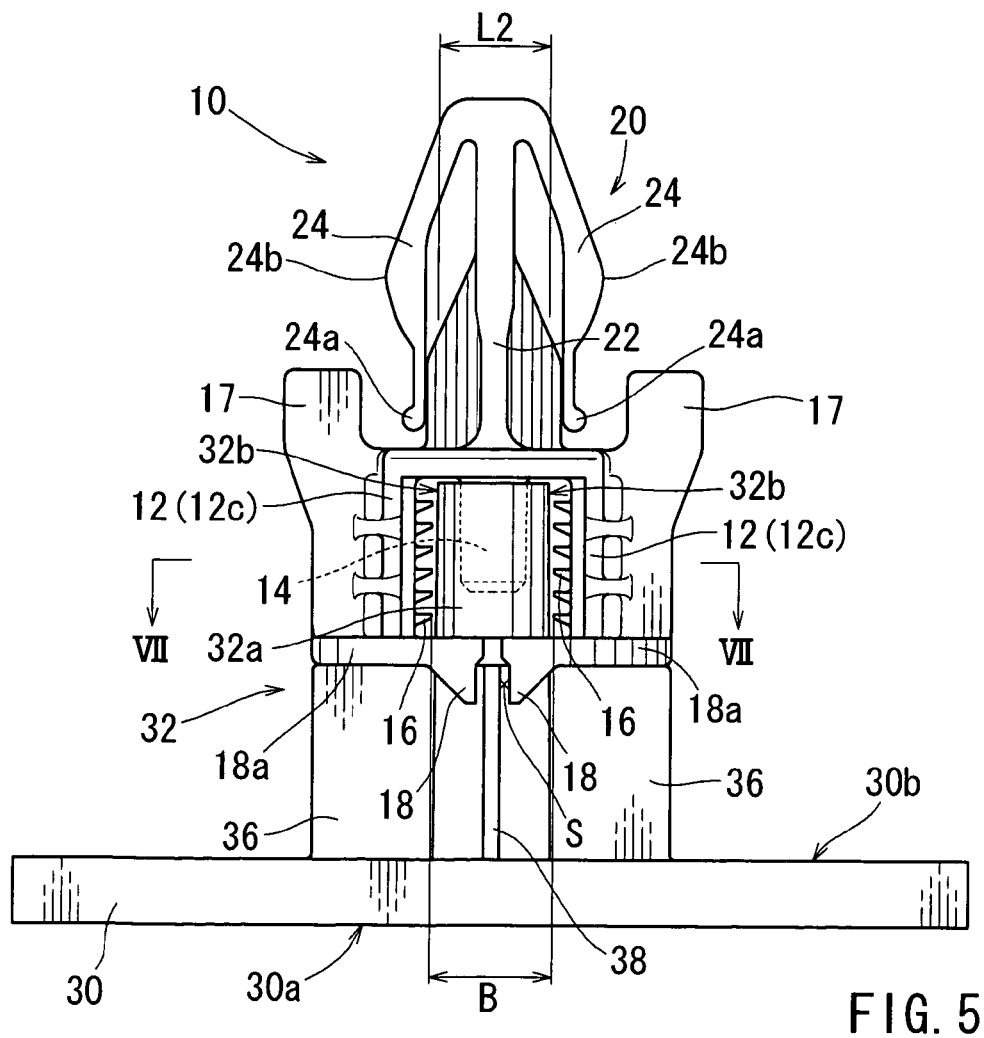
FIG. 5 is an elevational view of the clip and the plate-shaped component, which illustrates a condition in which the clip is placed on the seat portion of the plate-shaped component.
Figure 7:
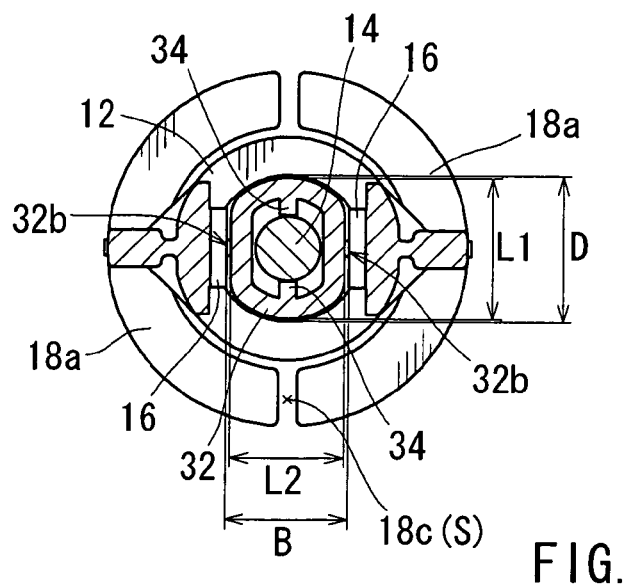
FIG. 7 is a cross-sectional view taken along line VII-VII in FIG. 5

As shown in FIG. 5, the seat portion 32 of the plate-shaped component 30 is constructed to be introduced into the base portion 12 of the clip 10 when the clip 10 is placed on the seat portion 32. In particular, an outer distance L2 between the flat wall portions 32b of the seat portion 32 (a minimum outer diameter of the seat portion 32) is determined so as to be smaller than the distance B between the diametrically opposite securing blades 16 (FIGS. 5 and 7). Conversely, an outer distance L1 between the arc-shaped wall portions 32a of the seat portion 32 (a maximum outer diameter of the seat portion 32) is determined so as to be substantially equal to or slightly smaller than the inner diameter D of the base portion 12 (FIG. 7). Further, the outer distance L1 between the arc-shaped wall portions 32a of the seat portion 32 is greater than the distance B between the diametrically opposite securing blades 16.

Further, as shown in FIGS. 4 and 5, the seat portion 32 is constructed such that the support shaft 14 formed in the clip base portion 12 can be introduced therein when the clip 10 is placed on the seat portion 32. In particular, an inner dimension L2' between the flat wall portions 32b of the seat portion 32 is determined so as to be substantially equal to or slightly greater than a diameter of the support shaft 14 (FIG. 4). Conversely, a pair of vertically extending rib portions 34 are formed in the arc-shaped wall portions 32a of the seat portion 32. The rib portions 34 are respectively formed in inner surfaces of the arc-shaped wall portions 32a so as to be inwardly oppositely projected therefrom. The rib portions 34 are determined such that an inner dimension L1' therebetween is substantially equal to or slightly greater than the diameter of the support shaft 14 (FIG. 4). Thus, the support shaft 14 can substantially be closely introduced into the seat portion 32 when the clip 10 is placed on the seat portion 32.

Further, as shown in FIGS. 1 and 4, the seat portion 32 has two (first and second) pairs of reinforcement rib members 36 and 38. The first pair of reinforcement ribs 36 are respectively integrally formed in outer surfaces of the flat wall portions 32b of the seat portion 32 and are respectively integrated with the inner surface 30b of the plate-shaped component 30. In particular, as best shown in FIG. 1, the reinforcement rib members 36 are respectively formed in lower half portions of the flat wall portions 32b so as to be diametrically outwardly oppositely projected therefrom. Conversely, the second pair of reinforcement ribs 38 are respectively integrally formed in outer surfaces of the arc-shaped wall portions 32a of the seat portion 32 and are respectively integrated with the inner surface 30b of the plate-shaped component 30. Similar to the reinforcement rib members 36, the reinforcement rib members 38 are formed in lower half portions of the arc-shaped wall portions 32a so as to be diametrically outwardly oppositely projected therefrom. Further, the reinforcement rib members 36 and 38 are respectively positioned around the seat portion 32 at 90 degrees intervals. Thus, the seat portion 32 can be rigidly or reliably integrated with the inner surface 30b of the plate-shaped component 30.

Figure 6:
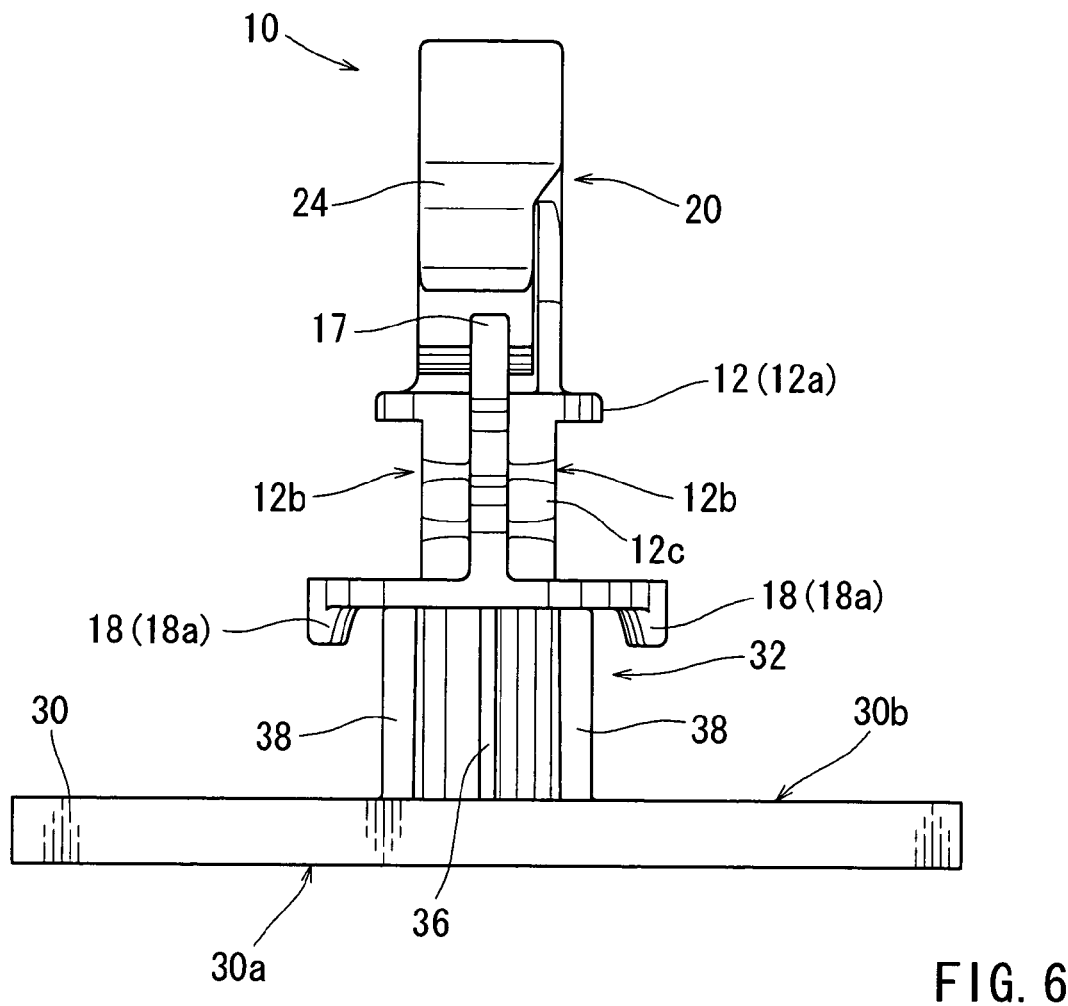
FIG. 6 is a side view of FIG. 5.

Further, as shown in FIG. 5, the reinforcement rib members 36 are respectively arranged and constructed such that the arm portions 18a of the clip base portion 12 can be seated thereon when the clip 10 (the base portion 12) is placed on the seat portion 32. Conversely, as shown in FIG. 6, the reinforcement rib members 38 are respectively arranged and constructed such that the arm portions 18a of the clip base portion 12 cannot be seated thereon when the clip 10 (the base portion 12) is placed on the seat portion 32. That is, the reinforcement rib members 38 are respectively shortened in width compared with the reinforcement rib members 36, so as to not interfere with each pair of lock pawls 18 when the clip 10 is rotated.

The plate-shaped component 30 (the attaching object) can be connected to the support member 40 (the support body) via the clip 10 according to the following procedure.

First, as shown in FIGS. 5 to 7, the clip 10 (the base portion 12) is axially (vertically) aligned with the seat portion 32 of the plate-shaped component 30 while the flat wall portions 32b of the seat portion 32 respectively correspond to the two rows of securing blades 16. Thereafter, the clip 10 is placed on the seat portion 32 while the seat portion 32 is introduced into the clip base portion 12, so that the arm portions 18a of the base portion 12 are seated on the reinforcement rib members 36 of the seat portion 32. At this time, the seat portion 32 of the plate-shaped component 30 can be introduced into the base portion 12 of the clip 10 without interfering with the securing blades 16 because the outer distance L2 between the flat wall portions 32b is smaller than the distance B between the diametrically opposite securing blades 16 (FIGS. 5 and 7). Further, when the seat portion 32 is introduced into the base portion 12, the support shaft 14 formed in the base portion 12 can substantially be closely introduced into the seat portion 32 because the inner dimension L1' between the rib portions 34 is substantially equal to or slightly greater than the diameter of the support shaft 14 as well as the inner dimension L2' between the flat wall portions 32b of the seat portion 32 (FIG. 4).

When the arm portions 18a of the base portion 12 are seated on the reinforcement rib members 36 of the seat portion 32, each of the reinforcement rib members 38 can be aligned with the lock space S that is formed between each pair of lock pawls 18 (FIG. 5). However, as shown in FIG. 6, each of the reinforcement rib members 38 cannot be positioned within the lock space S that is formed between each pair of lock pawls 18 because each of the reinforcement rib members 38 is shortened in width compared with each of the reinforcement rib members 36. In other words, each of the reinforcement rib members 38 does not engage each pair of lock pawls 18.

Figure 9:
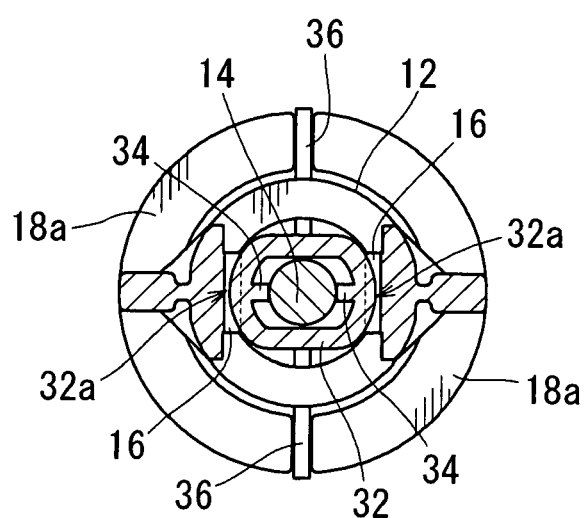
FIG. 9 is a cross-sectional view taken along line IX-IX in FIG. 8.

Thereafter, the clip 10 (the base portion 12) is rotated rightwardly or leftwardly (clockwise or counterclockwise) about the axis thereof about 90 degrees using the manipulator strips 17. Upon rotation of the clip 10, as shown in FIGS. 8 and 9, the two rows of securing blades 16 formed in the clip base portion 12 are respectively rotated relative to the seat portion 32. As a result, the respective securing blades 16 can engage or bite into the arc-shaped wall portions 32a of the seat portion 32 because the outer distance L1 between the arc-shaped wall portions 32a is greater than the distance B between the diametrically opposite securing blades 16. Thus, the base portion 12 of the clip 10 can be secured to the seat portion 32 of the plate-shaped component 30, so that the clip 10 is attached to the plate-shaped component 30.

Further, as shown in FIGS. 8 and 9, upon rotation of the clip 10 through 90 degrees, the arm portions 18a of the base portion 12 can respectively be rotated in the same direction through 90 degrees. At this time, one of each pair of lock pawls 18 clears the corresponding reinforcement rib member 36 while the corresponding arm portion 18a is elastically flexed upwardly with respect to the lower end of the manipulator strip 17. As a result, each pair of lock pawls 18 can be shifted to a condition in which each of the reinforcement rib members 36 is interleaved therebetween. Thus, each pair of lock pawls 18 can substantially engage each of the reinforcement rib members 36, so that the clip 10 is rotationally restricted or locked. That is, the clip 10 (the base portion 12) can be prevented from being further rotated. Therefore, the clip 10 can be reliably attached to the plate-shaped component 30.

Subsequently, the anchor portion 20 of the clip 10 is inserted into the attachment hole 42 formed in the support member 40 (FIG. 8) until the bulged portions 24b of the anchor portion 20 are positioned inside the support member 40 (i.e., until the bulged portions 24b can elastically engage an inner surface of the support member 40). As a result, the anchor portion 20 (the clip 10) can be securely coupled to the support member 40. Thus, the plate-shaped component 30 can be connected to the support member 40 via the clip 10.

Further, the arm portions 18a flexed upwardly can be elastically restored or snapped back immediately after the corresponding lock pawls 18 respectively clear the reinforcement rib members 36. Therefore, tactile impact caused by snapping back motions of the arm portions 18a can be transmitted to the clip base portion 12. Thus, it is possible to sensuously know whether the two pairs of lock pawls 18 respectively engage the reinforcement rib members 36 (i.e., whether the clip 10 is rotationally restricted or locked).

In addition, the arm portions 18a respectively arcuately extend along the lower end periphery of the base portion 12. Therefore, each of the arm portions 18a can have a substantial length. That is, a length between the proximal and distal ends of each of the arm portions 18a (i.e., a distance between the lower end of the manipulator strip 17 and the lock pawl 18) can be effectively lengthened. Thus, the arm portion 18a can be smoothly flexed.

Further, when the clip 10 is placed on the seat portion 32, the arc-shaped wall portions 32a of the seat portion 32 can substantially be supported or rigidified by the support shaft 14 of the clip 10 via the rib portions 34. Therefore, when the clip 10 is rotated in order to engage the securing blades 16 with the arc-shaped wall portions 32a, the arc-shaped wall portions 32a can be effectively prevented from being flexed or deformed inwardly. As a result, the respective securing blades 16 can reliably engage the arc-shaped wall portions 32a, so that the clip 10 can be reliably secured to the seat portion 32. Thus, even if the seat portion 32 (the arc-shaped wall portions 32a and the flat wall portions 32b) is uniformed and thinned in wall thickness, the respective securing blades 16 can reliably engage the arc-shaped wall portions 32a, so that the clip 10 can be reliably secured to the seat portion 32.

Figure 10:
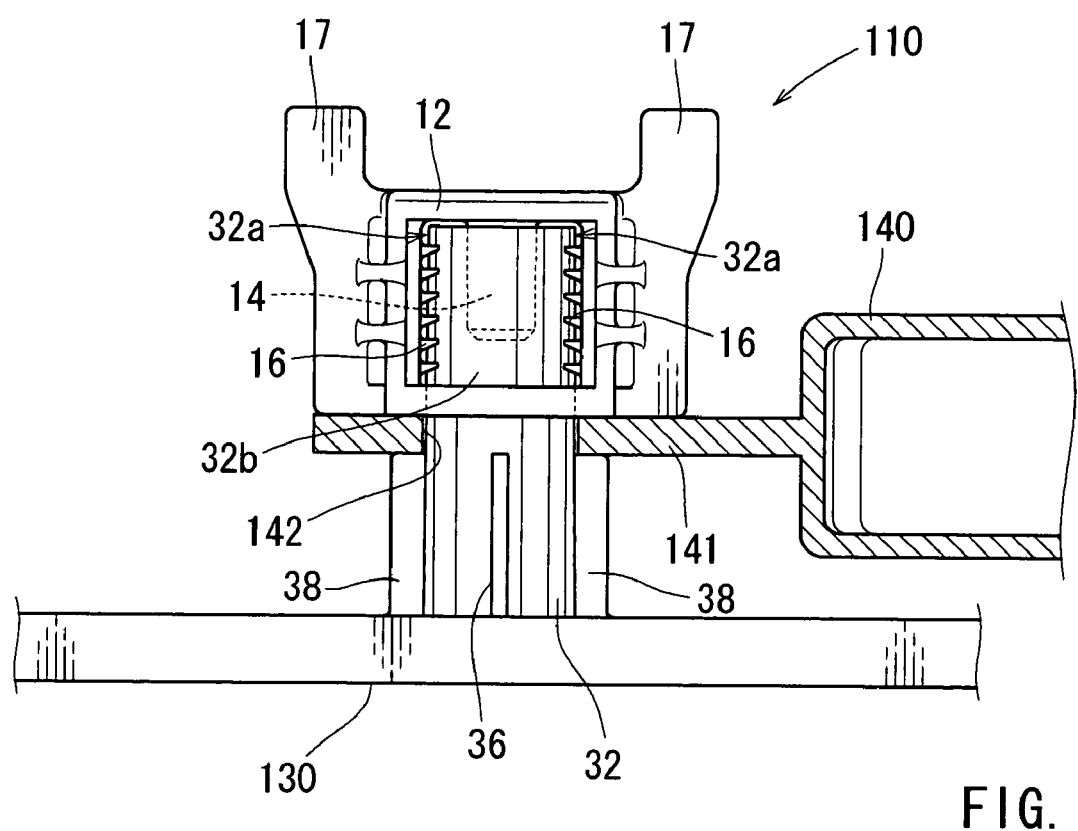
FIG. 10 is an elevational view of a clip and a plate-shaped component according to a second embodiment of the present invention, which illustrates a condition in which the clip is attached to a plate-shaped component and in which the clip is inserted into an attachment hole of a support member.

The second detailed representative embodiment will now described in detail with reference to FIG. 10.

Because the second embodiment relates to the first embodiment, only the constructions and elements that are different from the first embodiment will be explained in detail. Elements that are the same in the first and second embodiments will be identified by the same reference numerals and a detailed description of such elements may be omitted.

The embodiment exemplifies a connecting structure for connecting a plastic plate-shaped component 130 (e.g., an instrument panel) to a support member 140 (e.g., an air duct) via a plurality of clips 110 (one of which is shown). Further, the plate-shaped component 130 may be referred to as the first component or the attaching object. Conversely, the support member 140 may be referred to as the second component or the support body.

In this embodiment, unlike the first embodiment, each of the clips 110 does not have a portion corresponding to the anchor portion 20 of the first embodiment. Also, the clip 110 does not have portions corresponding to the arm portions 18a and the lock pawls 18. Further, a plurality of attachment holes 142 (one of which is shown) are formed in the support member 140. Further, unlike the attachment hole 42 of the support member 40, each of the attachment holes 142 may preferably be shaped to correspond to the seat portion 32 of the plate-shaped component 130.

In order to connect the plate-shaped component 130 (the attaching object) to the support member 140 (the support body) via the clip 110, first, the seat portion 32 of the plate-shaped component 130 is inserted into the attachment holes 142 formed in the support member 140, so that the support member 140 is seated on the reinforcement rib members 36 and 38 of the seat portion 32. Next, the clip 110 (the base portion 12) is placed on the seat portion 32 while the seat portion 32 is introduced into the clip base portion 12, so that the base portion 12 is seated on the support member 140. Thus, the clip 110 can be placed on the seat portion 32 while the support member 140 is interleaved therebetween.

Thereafter, the clip 110 (the base portion 12) is rotated rightwardly or leftwardly (clockwise or counterclockwise) about the axis thereof about 90 degrees using the manipulator strips 17. Upon rotation of the clip 110, similar to the first embodiment, the two rows of securing blades 16 are respectively rotated relative to the seat portion 32. As a result, the respective securing blades 16 can engage the arc-shaped wall portions 32a of the seat portion 32. Thus, the base portion 12 of the clip 110 can be secured to the seat portion 32 of the plate-shaped component 130 while the support member 140 is interleaved therebetween. As a result, the plate-shaped component 130 can be connected to the support member 140 via the clip 110.

What is claimed is:

1. A connecting structure for connecting a first component to a second component, comprising:
    a clip capable of engaging the second component and having a substantially hollow main body, the main body of the clip having a support shaft and at least one engagement blade formed therein;
    a substantially hollow seat portion integrally formed in the first component and having at least one engagement wall portion;
    the clip main body is constructed to be placed on the seat portion while the seat portion is introduced into the substantially hollow main body;
    the support shaft of the clip is constructed to be introduced into the seat portion when the clip main body is placed on the seat portion; and
    the at least one engagement wall portion of the seat portion has at least one rib portion capable of contacting the support shaft introduced into the seat portion, the at least one rib portion being formed in the at least one engagement wall portion so as to longitudinally extend therealong and to contact the support shaft in the longitudinal direction along its length, so that the at least one engagement wall portion is supported and rigidified by the at least one rib portion contacting the support shaft;
    wherein the at least one engagement blade is arranged to engage the at least one engagement wall portion when the clip is rotated about an axis thereof, so that the clip can be secured to the seat portion.

2. The connecting structure according to claim 1, wherein the at least one engagement blade comprises at least two engagement blades that are positioned diametrically opposite to each other, and wherein the at least one engagement wall portion comprises a pair of diametrically opposite engagement wall portions.

3. The connecting structure according to claim 2, wherein the at least one rib portion comprises a pair of rib portions that are respectively formed in the engagement wall portions.

4. The connecting structure according to claim 1, wherein the clip has an anchor portion, and wherein the anchor portion is constructed to be inserted into an attachment hole formed in the second component.

5. The connecting structure according to claim 1, wherein the clip main body is constructed to be placed on the seat portion while the second component is interleaved therebetween.

6. A connecting structure for connecting a first component to a second component, comprising:
    a clip capable of engaging the second component and having a substantially hollow main body, the main body of the clip having a support shaft and at least one engagement blade formed therein; and
    a substantially hollow seat portion integrally formed in the first component and having at least one engagement wall portion;
    the clip main body is constructed to be placed on the seat portion while the seat portion is introduced into the substantially hollow main body;
    the support shaft of the clip is constructed to be introduced into the seat portion when the clip main body is placed on the seat portion;
    the at least one engagement wall portion of the seat portion has at least one rib portion capable of contacting the support shaft introduced into the seat portion;
    the at least one engagement blade is arranged to engage the at least one engagement wall portion when the clip is rotated about an axis thereof, so that the clip can be secured to the seat portion; and
    the clip main body is constructed to be placed on the seat portion while the second component is interleaved therebetween.

* * * * *